United States Patent
Hiramatsu

(10) Patent No.: US 7,916,368 B2
(45) Date of Patent: Mar. 29, 2011

(54) IMAGE PROCESSING DEVICE AND METHOD FOR MAINTAINING THE COLOR SHADE OF LOW-CHROMA COLOR REGIONS OF AN IMAGE

(75) Inventor: Naoko Hiramatsu, Kyoto (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 755 days.

(21) Appl. No.: 11/312,736

(22) Filed: Dec. 21, 2005

(65) Prior Publication Data

US 2007/0070474 A1    Mar. 29, 2007

(30) Foreign Application Priority Data

Sep. 22, 2005   (JP) ................... 2005-276519

(51) Int. Cl.
*H04N 1/46* (2006.01)
(52) U.S. Cl. ........ 358/538; 358/1.9; 358/3.27; 358/518; 358/523; 358/525; 382/162; 382/167; 382/173; 382/268
(58) Field of Classification Search .......... 358/518–521, 358/1.9, 538, 452, 453, 529; 382/167; 345/581, 345/600–602
See application file for complete search history.

(56) References Cited

U.S. PATENT DOCUMENTS

| | | | |
|---|---|---|---|
| 5,613,046 A * | 3/1997 | Dermer ........................... | 358/1.9 |
| 5,761,392 A * | 6/1998 | Yacoub et al. ................. | 358/1.9 |
| 5,767,876 A * | 6/1998 | Koike et al. ..................... | 347/43 |
| 5,784,172 A | 7/1998 | Coleman | |
| 6,695,435 B1 * | 2/2004 | Cheng et al. ..................... | 347/43 |
| 6,753,976 B1 * | 6/2004 | Torpey et al. .................. | 358/1.9 |
| 6,773,175 B2 * | 8/2004 | Yamamoto ....................... | 400/61 |
| 6,888,648 B2 * | 5/2005 | Odagiri et al. .................. | 358/1.9 |
| 2003/0019381 A1 | 1/2003 | Yamamoto | |
| 2003/0174200 A1 * | 9/2003 | Izumiya et al. ............... | 347/249 |
| 2003/0188659 A1 * | 10/2003 | Merry et al. ................... | 101/483 |
| 2005/0225783 A1 * | 10/2005 | Suzuki ........................... | 358/1.9 |

FOREIGN PATENT DOCUMENTS

| | | |
|---|---|---|
| JP | 8-18812 | 1/1996 |
| JP | 08-030063 | 2/1996 |
| JP | 8-123126 | 5/1996 |
| JP | 10-052947 | 2/1998 |
| JP | 2002-135613 | 5/2002 |
| JP | 2002-369022 | 12/2002 |
| JP | 2004-174964 | 6/2004 |
| JP | 2004-364144 | 12/2004 |

\* cited by examiner

*Primary Examiner* — Mark K Zimmerman
*Assistant Examiner* — Javier J Ramos
(74) *Attorney, Agent, or Firm* — Buchanan Ingersoll & Rooney PC

(57) ABSTRACT

In an image processing device, from an object image, an area reproduced by K component only and having at least a prescribed density is extracted as a gray area to be replaced, and a color of an area neighboring the gray area is extracted. When the neighboring area contains a color other than the K component, a replacing color is calculated based on the amount of K component (luminance) of the gray area and the color of the neighboring area, and the color of the gray area is replaced by the replacing color.

24 Claims, 15 Drawing Sheets

BYTE Ktable[3][3][3][3][4]

| ADDRESS FROM HEAD | ARRAY | CORRESPONDING INPUT | OUTPUT |
|---|---|---|---|
| 0 | [0][0][0][0][0] | K=100, L=0. a=-5, b=-5 | C |
| 1 | [0][0][0][0][1] | K=100, L=0. a=-5, b=-5 | M |
| 2 | [0][0][0][0][2] | K=100, L=0. a=-5, b=-5 | Y |
| 3 | [0][0][0][0][3] | K=100, L=0. a=-5, b=-5 | K |
| 4 | [0][0][0][1][0] | K=100, L=0. a=-5, b=0 | C |
| 5 | [0][0][0][1][1] | K=100, L=0. a=-5, b=0 | M |
| ⋮ | | ⋮ | ⋮ |
| 107 | [0][2][2][2][3] | K=100, L=100. a=5, b=5 | K |
| 108 | [1][0][0][0][0] | K=75, L=0. a=-5, b=-5 | C |
| ... | | ... | ... |
| 319 | [2][2][2][1][3] | K=50, L=100. a=5, b=0 | K |
| 320 | [2][2][2][2][0] | K=50, L=100. a=5, b=5 | C |
| 321 | [2][2][2][2][1] | K=50, L=100. a=5, b=5 | M |
| 322 | [2][2][2][2][2] | K=50, L=100. a=5, b=5 | Y |
| 323 | [2][2][2][2][3] | K=50, L=100. a=5, b=5 | K |

FIG.16B

|   | 0 | 1 | 2 |
|---|---|---|---|
| L | 0 | 50 | 100 |
| a | -5 | 0 | 5 |
| b | -5 | 0 | 5 |
| K | 100 | 75 | 50 |

IMAGE PROCESSING DEVICE AND METHOD FOR MAINTAINING THE COLOR SHADE OF LOW-CHROMA COLOR REGIONS OF AN IMAGE

This application is based on Japanese Patent Application No. 2005-276519 filed with the Japan Patent Office on Sep. 22, 2005, the entire content of which is hereby incorporated by reference.

BACKGROUND OF THE INVENTION

1. Field of the Invention

The present invention relates to an image processing device, an image processing method and an image processing program product and, more specifically, to an image processing device, an image processing method and an image processing program product that are capable of high quality color output of digital data.

2. Description of the Related Art

In an image forming device such as a 4-cycle image forming device or a color tandem image forming device, when digital data of an electronic photograph, for example, is to be output in color, a multi-colored image is formed by superposing presses corresponding to toners of cyan (C), magenta (M), yellow (Y) and black (K), as basic colors, respectively.

More specifically, in a color tandem image forming device, for example, four image forming units each including a developer are arranged along an intermediate transfer belt, presses as toner images of respective colors formed by respective units are transferred onto the intermediate transfer belt (primary transfer), and by the superposition of the presses, a multi-colored image is formed. Then, the image formed by registration on the intermediate transfer belt is transferred onto a sheet of paper as a recording medium (secondary transfer), and after a fixing step, the result is output.

When the color image to be output has an image of K component only (K-image) arranged on a color background image including (at least one of) CMY components, a white gap may appear at the boundary between the background and the K-image.

Further, even when the image arranged over the background is not only of the K component but a gray image of low chroma formed of CMYK components and the CMYK components of the background image portion and the CMYK components of the gray image portion may have some overlapping CMYK component, a similar gap, though slightly colored with toner but almost white, may appear at the boundary between the background and the gray image, because of mis-registration of presses, if the amount of overlapping component is small.

In order to prevent such a gap, a process called "overprinting" has been used, in which a K-image or a gray image is arranged on top of the background image to fill also the K-image portion with the background color. Conventionally, overprinting is done simply by superposing a K-image formed of K component only on top of the background color, or by superposing a K-image formed of K component with the background color made thinner, as disclosed in Japanese Laid-Open Patent Publication No. 2004-174964.

When overprinting is done, however, unwanted color mixing of the single K component of the K-image and the background color occurs, changing the color shade of gray, so that the color of single K component comes to be different from the color in the overprinted area. Though the background color is made thinner in the method disclosed in the laid-open application mentioned above, it is still true that a different color shade is added as the background color, and color shift always occurs by superposing, unless the background color is of low chroma.

SUMMARY OF THE INVENTION

The present invention was made in view of these problems, and its object is to provide an image processing device, an image processing method and an image processing program product that provide high-quality color output of digital data, by replacing a specific area of an object image with toners of respective colors at a ratio corresponding to the background color, so as to maintain the color shade of the replacement area while preventing any white gap.

In order to attain the above-described object, according to an aspect, the present invention provides an image processing device, including: an area extracting unit for extracting, from an object image, a first area represented by a low-chroma color of black only or two or more of basic colors consisting of black, yellow, magenta and cyan; a neighboring color extracting unit extracting a neighboring color as a color of a second area neighboring the first area; a determining unit determining whether the color of the first area and the neighboring color should be superposed or not; a replacing color calculating unit for calculating, for a replacement area that is the first area determined by the determining unit to be superposed, a replacing color closer to the tone of the color of the replacement area before superposing than the tone of the color resulting from superposing the color of the replacement area and the neighboring color, based on the color of the replacement area and the neighboring color; and a color replacing unit for replacing the color of the replacement area with the replacing color.

According to another aspect, the present invention provides, in an image processing device, a method of image processing, including: the area extracting step of extracting, from an object image input to the image processing device, a first area represented by a low-chroma color of black only or two or more of basic colors consisting of black, yellow, magenta and cyan; the neighboring color extracting step of extracting a neighboring color as a color of a second area neighboring the first area; the determining step of determining whether the color of the first area and the neighboring color should be superposed or not; the replacing color calculating step of calculating, for a replacement area that is the first area determined by the determining unit to be superposed, a replacing color closer to the tone of the color of the replacement area before superposing than the tone of the color resulting from superposing the color of the replacement area and the neighboring color, based on the color of the replacement area and the neighboring color; and the color replacing step of replacing the color of the replacement area with the replacing color.

According to a still further aspect, the present invention provides a program product causing a computer to execute, in an image processing device, image processing, including: the area extracting step of extracting, from an object image input to the image processing device, a first area represented by a low-chroma color of black only or two or more of basic colors consisting of black, yellow, magenta and cyan; the neighboring color extracting step of extracting a neighboring color as a color of a second area neighboring the first area; the determining step of determining whether the color of the first area and the neighboring color should be superposed or not; the replacing color calculating step of calculating, for a replacement area that is the first area determined by the determining unit to be superposed, a replacing color closer to the tone of the color of the replacement area before superposing than the tone of the color resulting from superposing the color of the replacement area and the neighboring color, based on the color of the replacement area and the neighboring color; and the color replacing step of replacing the color of the replacement area with the replacing color.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16A is a specific example of the four-dimensional LUT represented by an array.

FIG. 16B represents numbers of respective arrays of the four-dimensional LUT and their correspondence to K, L, a and b values.

DESCRIPTION OF THE PREFERRED EMBODIMENTS

Figure 1:
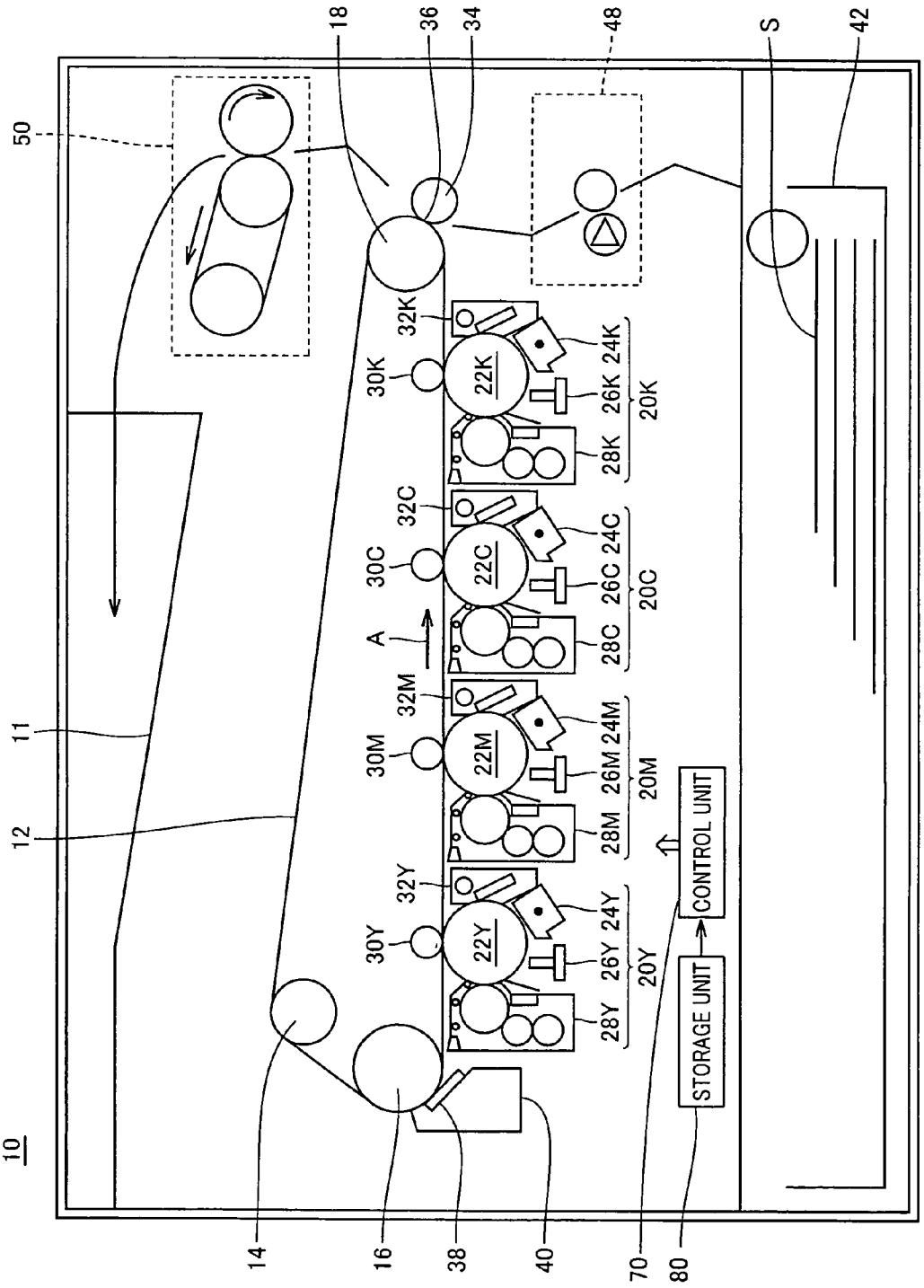
FIG. 1 is a schematic cross section representing an overall structure of a printer 10 in accordance with an embodiment.

Embodiments of the present invention will be described in the following with reference to the figures. In the following description, the same parts and components are denoted by the same reference characters. Their names and functions are also the same.

In the present embodiment, description will be given assuming that the image forming device of the invention is applied to a tandem type digital color printer (hereinafter referred to as a printer). It is noted, however, that the image forming device in accordance with the present invention is not limited to a printer, and it may be a tandem type facsimile device or an MFP (Multi Function Peripheral). Alternatively, the present invention may be applied to a computer such as a personal computer connected to an image output device such as a printer.

FIG. 1 is a schematic cross section representing an overall structure of a printer 10 in accordance with the present embodiment.

Referring to FIG. 1, printer 10 includes: an intermediate transfer belt 12 that is an endless belt suspended not to be slack around rollers 14, 16 and 18, rotated at a prescribed rate in a direction indicated by an arrow A in FIG. 1 as roller 16 rotates counterclockwise in FIG. 1; image forming units 20Y, 20M, 20C and 20K (image forming units 20Y, 20M, 20C and 20K are also generally represented by an image forming unit 20) corresponding to toners of yellow (Y), magenta (M), cyan (C) and black (K) as basic colors, arranged at a prescribed distance along intermediate transfer belt 12; a secondary transfer roller 34 paired with roller 18 with intermediate transfer belt 12 pinched therebetween; a recovery cleaner 38 positioned at a portion of intermediate transfer belt 12 supported by roller 16, scraping off residual toner and the like on intermediate transfer belt 12 after secondary transfer and collecting the scraped toner to waste tonal box 40; a paper feed cassette 42 containing sheets of paper S as the recording medium; a paper conveying unit 48 feeding a sheet of paper S coming from paper feed cassette 42 to a secondary transfer area 36 in synchronization with a toner image on intermediate transfer belt 12; a fixing unit 50 for fixing the secondary transferred toner image to the sheet S; a paper discharge tray 11 for discharging the printed sheet of paper; a control unit 70 including a CPU (Central Processing Unit) and the like; and a storage unit 80 storing a program to be executed by control unit 70 and characteristics of the device such as a color profile of printer 10.

Further, the image forming unit 20 described above includes: photo receptor drums 22Y, 22M, 22C and 22K (generally referred to as a photo receptor drum 22); corona chargers 24Y, 24M, 24C and 24K (generally referred to as a corona charger 24) for uniformly charging surfaces of respective photo receptor drums 22; print heads 26Y, 26M, 26C and 26K (generally referred to as a print head 26) outputting a laser beam to respective photo receptor drums 22 based on data of respective colors forming the color image data, exposing the uniformly charged surfaces of respective photo receptor drums in accordance with the image data to form latent electrostatic images; developers 28Y, 28M, 28C and 28K (generally referred to as a developer 28) developing the latent electrostatic images formed on the surfaces of respective photo receptor drums 22 with toners of respective colors to form toner images; transfer chargers 30Y, 30M, 30C and 30K (generally referred to as a transfer charger 30) paired with respective photo receptor drums 22 with intermediate transfer belt 12 pinched therebetween, for primary transfer of the toner images formed on the surfaces of respective photo receptor drums on intermediate transfer belt 12; and cleaners 32Y, 32M, 32C and 32K (generally referred to as a cleaner 32) recovering toners remaining on the surfaces of respective photo receptor drums 22 after primary transfer.

Control unit 70 executes a prescribed program stored in storage unit 80, to perform a prescribed image processing on image signals input from an external device or an image reading device, and forms digital signals color-converted to respective colors of yellow, magenta, cyan and black. The thus formed digital signals are input from control unit 70 to print head 26. Further, it outputs control signals as needed, for controlling a motor driving the paper conveying unit, a motor driving the secondary transfer roller and the like to various portions shown in FIG. 1, to execute printing.

The digital signals output from control unit 70 to print head 26 includes image color data C for cyan, image color data M for magenta, image color data Y for yellow, image color data K for black for forming the image and image color data R for recycle, or a reference pattern to be used for image stabilizing process, which will be described later.

Print head 26 outputs a laser beam to respective photo receptor drums 22 based on the image color data C, M, Y and K as well as the reference pattern input from control unit 70.

In each image forming unit 20, based on the control signals and the digital signals, exposure, development and transfer take place, and toner images of respective colors are superposed on intermediate transfer belt 12 (primary transfer).

Secondary transfer roller 34 is movable and switched to positions to be in contact/out of contact with intermediate transfer belt 12. The area where secondary transfer roller 34 and intermediate transfer belt 12 are in contact with each other forms a transfer area 36, and the sheet S fed from paper feed cassette 42 is supplied by paper conveying unit 48 to transfer area 36. As intermediate transfer belt 12 is brought into contact with the sheet S supplied to transfer area 36, the toner image superposed on intermediate transfer belt 12 is transferred to the sheet S (secondary transfer).

The sheet S on which the toner image has been transferred is heated by a fixing roller pair provided at fixing unit 50. Consequently, the toner melts and is fixed on the sheet S. Thereafter, the sheet S is discharged to discharge tray 11.

Figure 2:
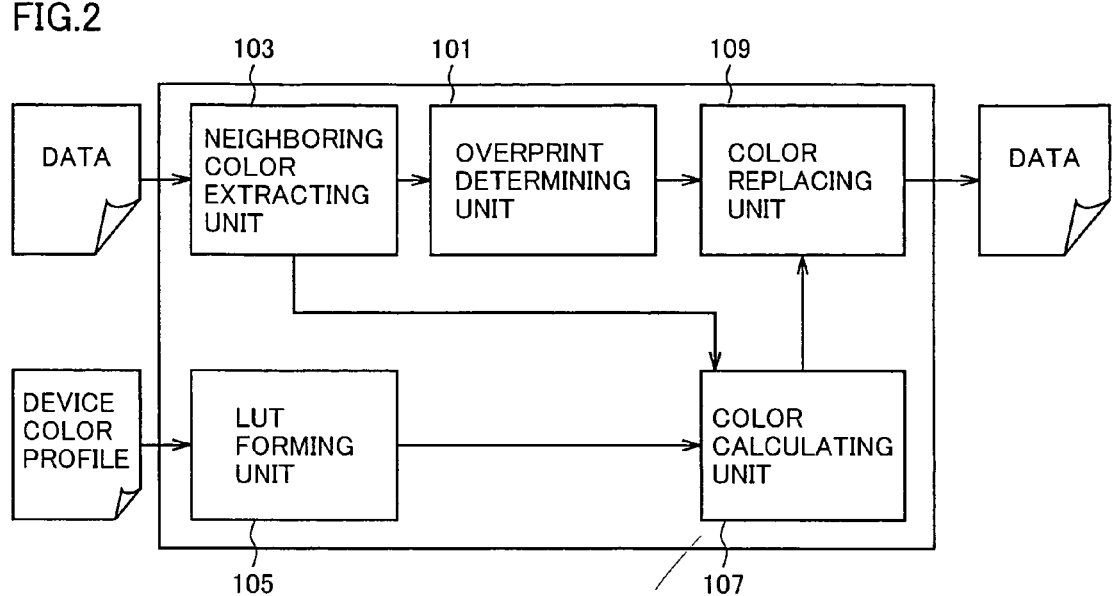
FIG. 2 is a block diagram representing a specific example of a software configuration of printer 10.

FIG. 2 is a block diagram showing a specific example of software configuration for performing image processing in printer 10, when the image to be output has an image of K component only (K-image) on a color background image containing (at least one of) CMY components. Each of the functions shown in FIG. 2 is formed in control unit 70 when a prescribed program stored in storage unit 80 is executed by control unit 70.

Referring to FIG. 2, control unit 70 implements functions of an overprint determining unit 101, a neighboring color extracting unit 103, a two-dimensional LUT (Look Up Table) forming unit 105 for overprinting, a color calculating unit 107 and a color replacing unit 109.

Neighboring color extracting unit 103 extracts a replacement area by analyzing an image signal input from an external device or an image reading device as the object image data to be processed and extracts a color of an area neighboring the replacement area, and inputs the extracted result to overprint determining unit 101 and color calculating unit 107. Overprint determining unit 101 determines whether overprinting is necessary or not on the replacement area, using the extracted neighboring color.

In overprint determining unit 101, whether overprinting is necessary or not is determined dependent on whether the phenomenon similar to white gap occurs or not. Specifically, determination is made by considering a condition that the color of replacement area (K only or CMYK) and the neighboring color (CMYK) does not overlap, or the amount of overlapping color or colors is lower than a prescribed value. By way of example, assume that the replacement area has the color of (C, M, Y, K)=(50%, 53%, 39%, 81%) and the neighboring color is (C, M, Y, K)=(0%, 0%, 5%, 0%). In this case, the amount of overlapping of respective colors is (C, M, Y, K)=(0%, 0%, 5%, 0%). Here, if the press for color K should shift, an almost white gap would appear in the output, though it is not perfectly white as there is 5% of Y. Therefore, overprint determining portion 101 determines that overprinting is necessary. The prescribed value mentioned above as the threshold value for determination differ type by type, and therefore, it is preferred to set an appropriate value through experiments and the like.

Then, overprint determining unit 101 inputs the replacement area, for which overprinting is determined to be necessary, to color replacing unit 109, and based on the result of determination, requests color replacing unit 109 for the processing.

Based on the color profile representing color attributes of printer 10 stored in storage unit 80, two-dimensional LUT forming unit 105 for overprinting forms a two-dimensional LUT for overprinting. The two-dimensional LUT for overprinting refers to a table, in which the amount of K component when gray is represented by K component only is plotted on an x-axis, the proportional relation of an amount of CMYK component and the K component (also referred to as a K component equivalent) when a color having the same luminance, hue and chroma as the gray color is represented by the CMYK components is plotted as an input value on the y-axis, and the corresponding CMYK value is stored as an output value at a lattice point. The method of forming at the two-dimensional LUT forming unit 105 for overprinting will be described later with reference to a formed LUT.

Color calculating unit 107 refers to the LUT formed by two-dimensional LUT forming unit 105 for overprinting, calculates a converting color as a replacing color for the replacement area based on information related to the color input from neighboring color extracting unit 103, and inputs the calculated color to color replacing unit 109. In response to a request from overprint determining unit 101, color replacing unit 109 replaces the color of the replacement area input from overprint determining unit 101 with the converting color input from color calculating unit 107.

In a first method of forming the two-dimensional LUT in the two-dimensional LUT forming unit 105 for overprinting, the amount of an arbitrary press is fixed, and based on the color profile of printer 10, the ratio of CMYK component (hereinafter referred to as the CMYK value) having a Lab value closest to the Lab value of the said press is searched.

Figure 3:
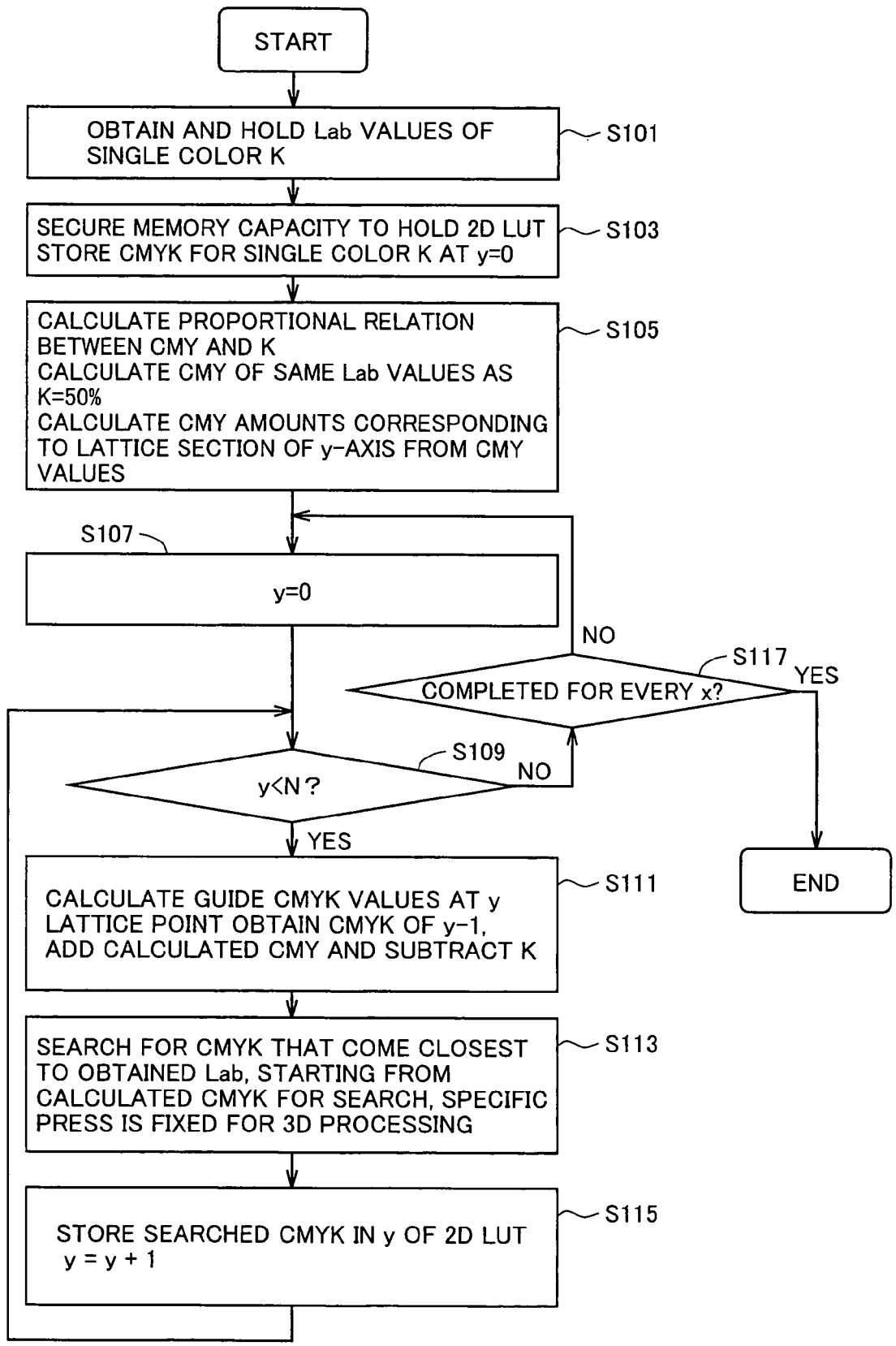
FIG. 3 is a flow chart representing a first method of forming a two-dimensional LUT in a two-dimensional LUT forming unit 105 for overprinting.

Referring to FIG. 3, first, the Lab value of single color K is obtained and held (step S101). Here, the amount of single color K corresponds to the x-axis of two-dimensional LUT.

Thereafter, a memory capacity necessary for holding the two-dimensional LUT is secured. Then, in a memory area corresponding to y=0, the CMYK values (such as (0, 0, 0, 50) are stored (step S103).

Next, the proportional relation between the CMY value and the K value is calculated (step S105). Specifically, first, the Lab value for the single color K with K=50% is obtained, and from a CMY space of the color profile with K fixed at K=0, a combination of CMY that attains the same Lab value as that for K=50% is calculated. From the calculated CMY and K values (K=50%), the proportion between the CMY value and the K value that corresponds to the lattice section (such as 0, 20, 40, 60, 80 and 100) of the y-axis is calculated. It is noted that the value calculated here is only a rough guide and not necessarily an exact value.

Next, the y value is initialized to 0 (step S107), and the following steps are executed until the y value attains N (N represents the number of lattice sections) (step S109).

Specifically, first, the guide CMYK value at each lattice point on the y-axis is calculated (step S111). In step S111, reference is made to the value of a lattice y−1 that is lower by one than the y-axis, so as to estimate the tendency of y. Namely, the CMY value calculated in step S105 is added to the value of lattice point y−1, and the K value calculated in step S105 is subtracted.

Next, from the color profile of printer 10, the CMYK value as the value of lattice point is searched for (step S113). In step S113, using the guide CMYK value calculated in step S111 as a start point, the start point and portions of ±1 around the start point are referred to. The CMYK values are converted to Lab values. If the point that attains the Lab value closest to the target Lab value is the start point, the process is terminated. If the closest value comes from a different point, the Lab value having the smallest color difference is newly set as the start point and the process of step S111 is performed again. In the memory space corresponding to the y-axis of the two-dimensional LUT, the CMYK value calculated in step S113 is stored. Thereafter, the value y is incremented by one (step S115).

The process of steps S111 to S115 is repeated until the value y reaches N (step S109). In step S117, whether the process described above has been completed for every value of x or not is determined, and if the process has been completed on every value of x (YES in S117), the two-dimensional LUT is formed in two-dimensional LUT forming unit 105 for overprinting.

As the second method of forming the two-dimensional LUT in two-dimensional LUT forming unit 105 for overprinting, the following method may be used, in which a virtual color space is formed that matches the K value to be put into the two-dimensional LUT, and the CMYK value for gray is calculated by searching in the color space.

First, through the same method as forming the printer profile, a Lab value→CMYK value conversion table is formed. Here, a Lab value→CMYK value conversion table with the value K being the maximum is used as a reference, and Lab value→CMYK value conversion tables with the value K decreased gradually are formed. The method of forming the Lab value→CMYK value conversion table is not specifically defined here, and the method proposed in Japanese Laid-Open Patent Publication No. 2002-369022 entitled "Color Conversion Table Generating Method, Color Conversion Method and Image Processor" or a method proposed in Japanese Laid-Open Patent Publication No. 2004-364144 entitled "Method and Program for Color Conversion" may be used.

Next, using the Lab value→CMYK value conversion table formed for each setting, the CMYK value that has the same Lab value as that of single color K is calculated. The CMYK value calculated by using the table with maximum K value is almost the same as that of single color K, and the CMYK value calculated by using the Lab value→CMYK value conversion table with the K value decreased has the CMY value increased and the K value decreased accordingly.

Finally, the calculated CMYK value is stored in the two-dimensional LUT. The density of single color K is plotted on the x-axis, and on the y-axis direction, the values are plotted such that the CMY value increases and the K value decreases as the y-value increases.

Figure 4:
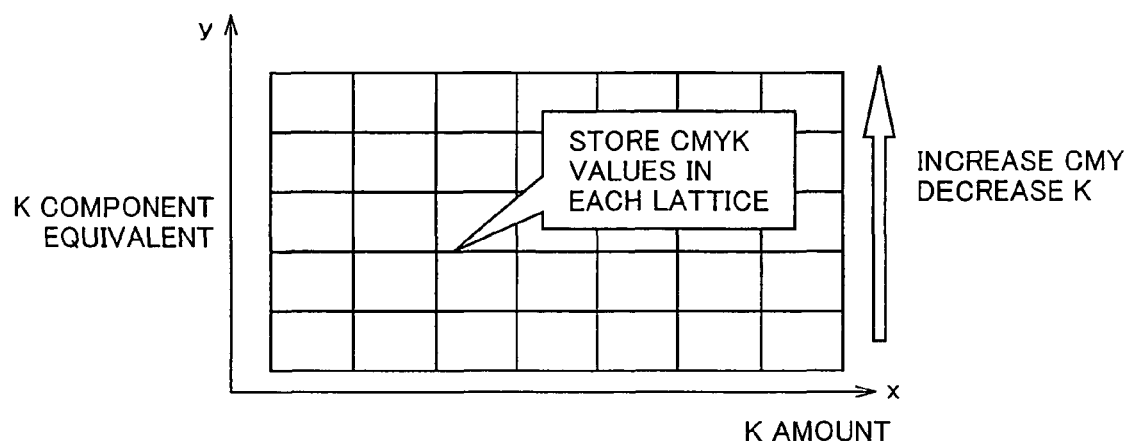
FIG. 4 illustrates the two-dimensional LUT.
Figure 5:
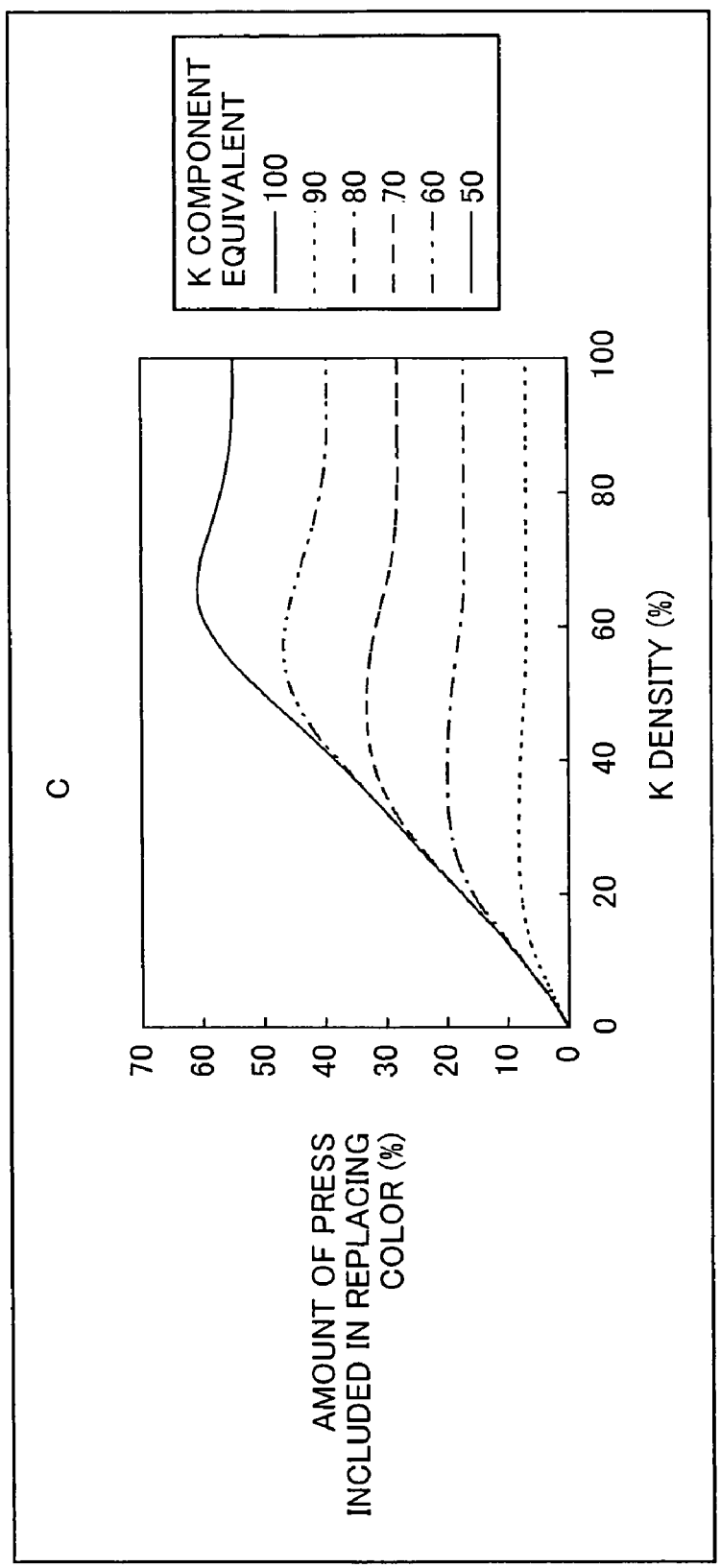
FIG. 5 shows a specific example of a relation between K component density and the ratio of C press amount in a replacing color for every K component equivalent, for calculating the C value.
Figure 6:
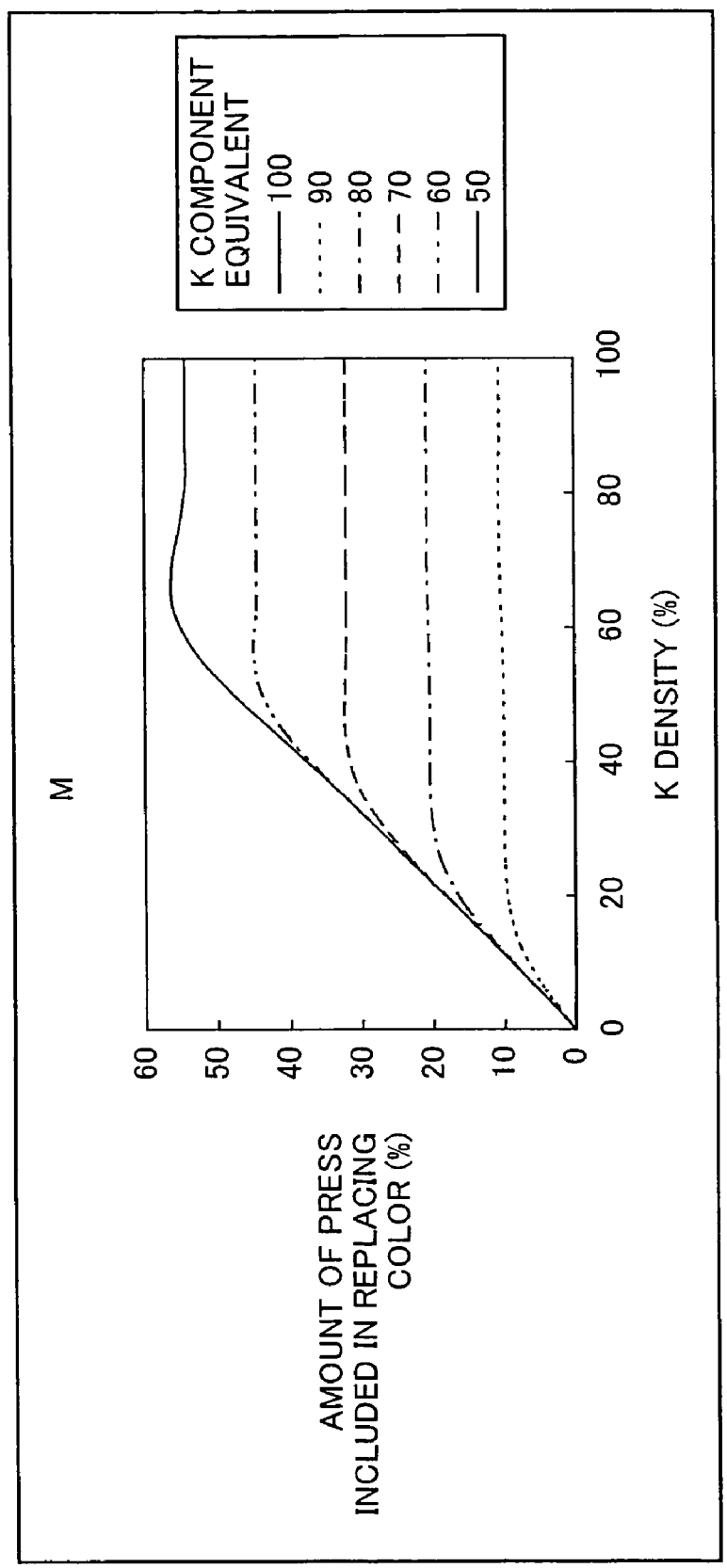
FIG. 6 shows a specific example of a relation between K component density and the ratio of M press amount in a replacing color for every K component equivalent, for calculating the M value.
Figure 7:
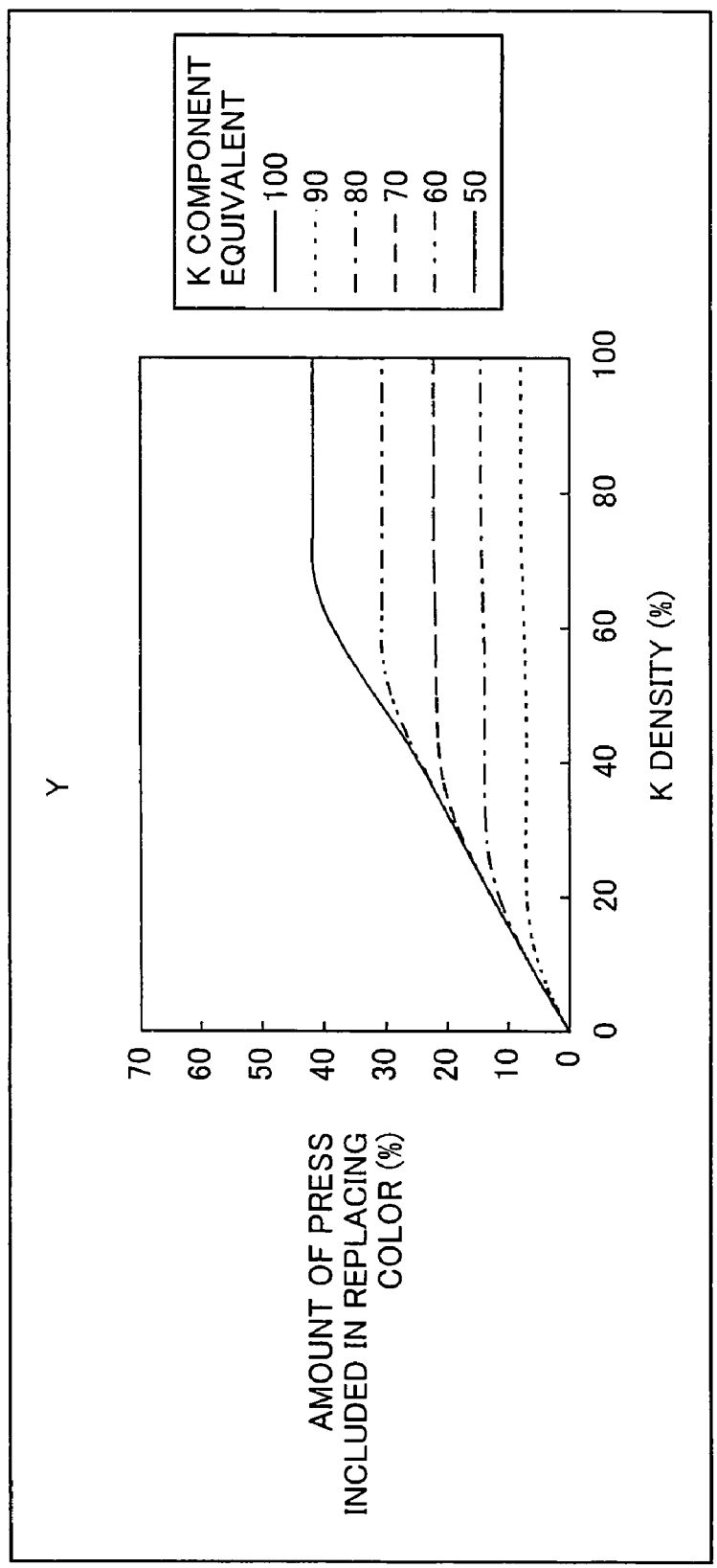
FIG. 7 shows a specific example of a relation between K component density and the ratio of Y press amount in a replacing color for every K component equivalent, for calculating the Y value.
Figure 8:
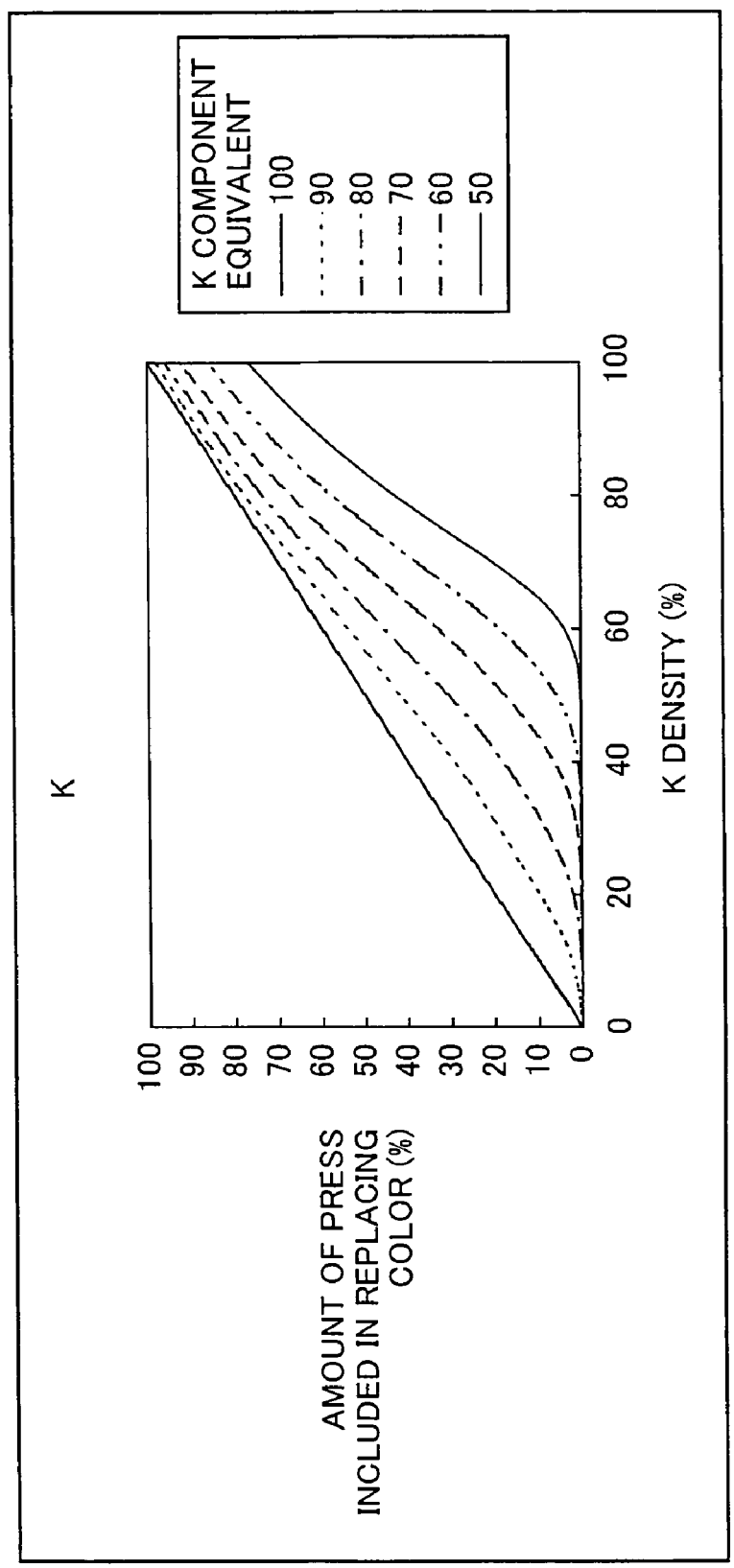
FIG. 8 shows a specific example of a relation between K component density and the ratio of K press amount in a replacing color for every K component equivalent, for calculating the K value.

Two-dimensional LUT forming unit 105 for overprinting forms the two-dimensional LUT for overprinting by, for example, the above-described two methods. FIG. 4 shows the two-dimensional LUT for overprinting formed by the two-dimensional LUT forming unit 105 for overprinting. Referring to FIG. 4, in the formed two-dimensional LUT for overprinting, the amount of K component represented by K component only (density of single color K) is plotted on the x-axis, the proportion between the amount of CMYK component and K component (K component equivalent) is plotted on the y-axis, and as the value is increased along the y-axis direction, the proportion of the CMY component increases and the K component decreases (the ratio of K component with respect to the CMYK component decreases).

FIGS. 5 to 8 show specific examples of the relation between K component density and the proportion of CMYK press amount of replacing color for every K component equivalent, for calculating each CMYK value, used for forming the two-dimensional LUT for overprinting.

In the specific example of the two-dimensional LUT for overprinting, the amount of K component as the density of single color K is on the x-axis. Alternatively, the luminance L may be on the x-axis. Further, though the K component equivalent representing the proportion between the amount of CMYK component and the K component is on the y-axis, other value may be used, provided that the value is a factor that changes the proportion of CMYK component reproducing the gray having the same Lab value.

Figure 9:
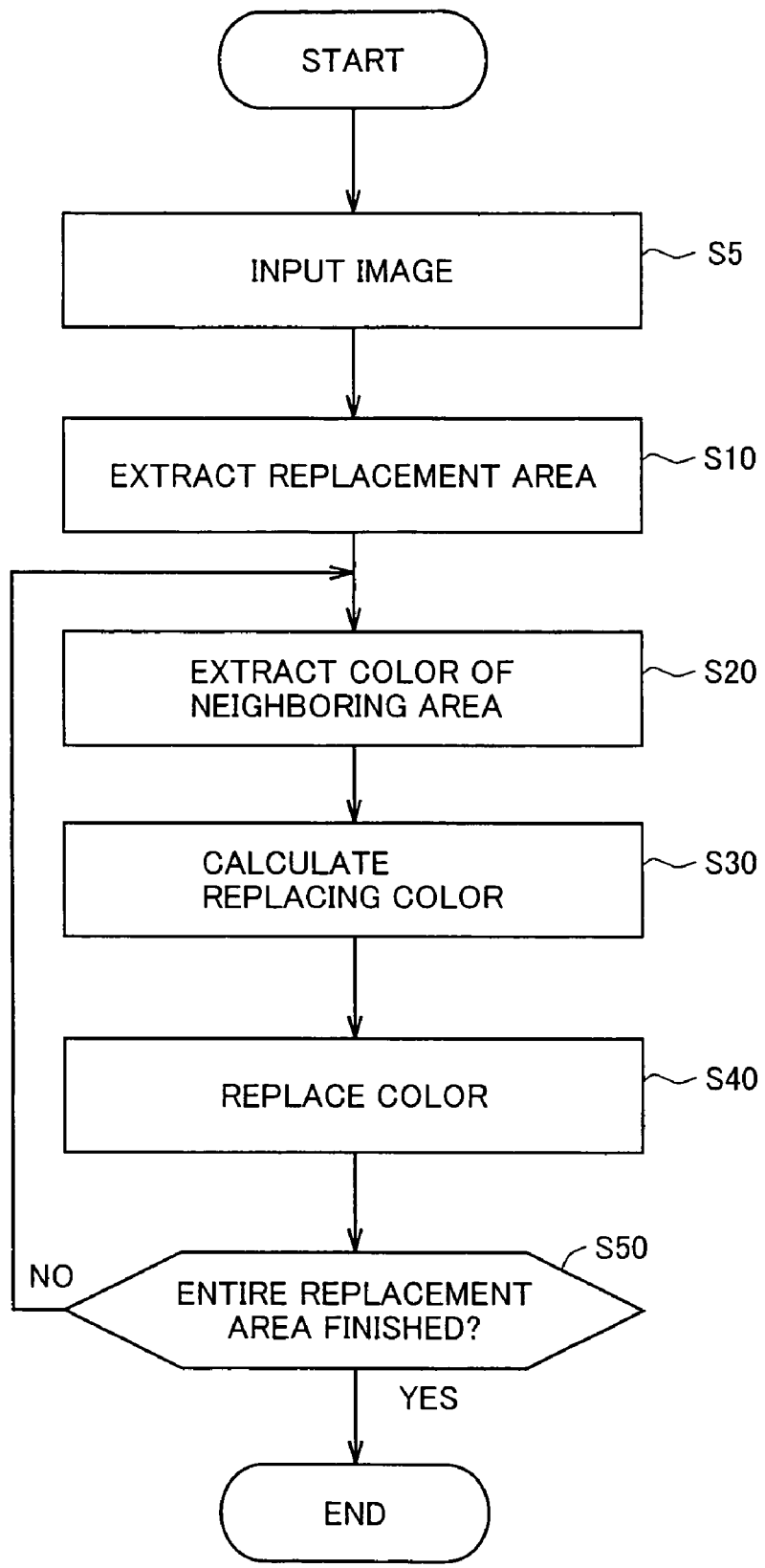
FIG. 9 is a flow chart representing a basic flow of image processing executed by printer 10.

Referring to FIG. 9, first, the color image to be output is obtained (step S5), and if the image has an image formed only of the K component (K-image) arranged on top of a color background image including (at least one of) the CMY components, a replacement area is extracted in overprint determining unit 101 (step S10), and the color of the area neighboring the replacement area is extracted by neighboring color extracting unit 103 (step S20).

Thereafter, the converting color is calculated in color calculating unit 107 (step S30), and by color replacing unit 109, the color of the replacement area is replaced with the converting color (step S40).

As the process of steps S20 to S40 is performed on the entire replacement area (YES in S50), the color of the entire replacement area is replaced by the converting color.

First Embodiment

In the first embodiment, in step S10 described above, a gray area reproduced only by the K component is extracted as the replacement area, as a specific example of the area represented in a color of low chroma.

Figure 10:
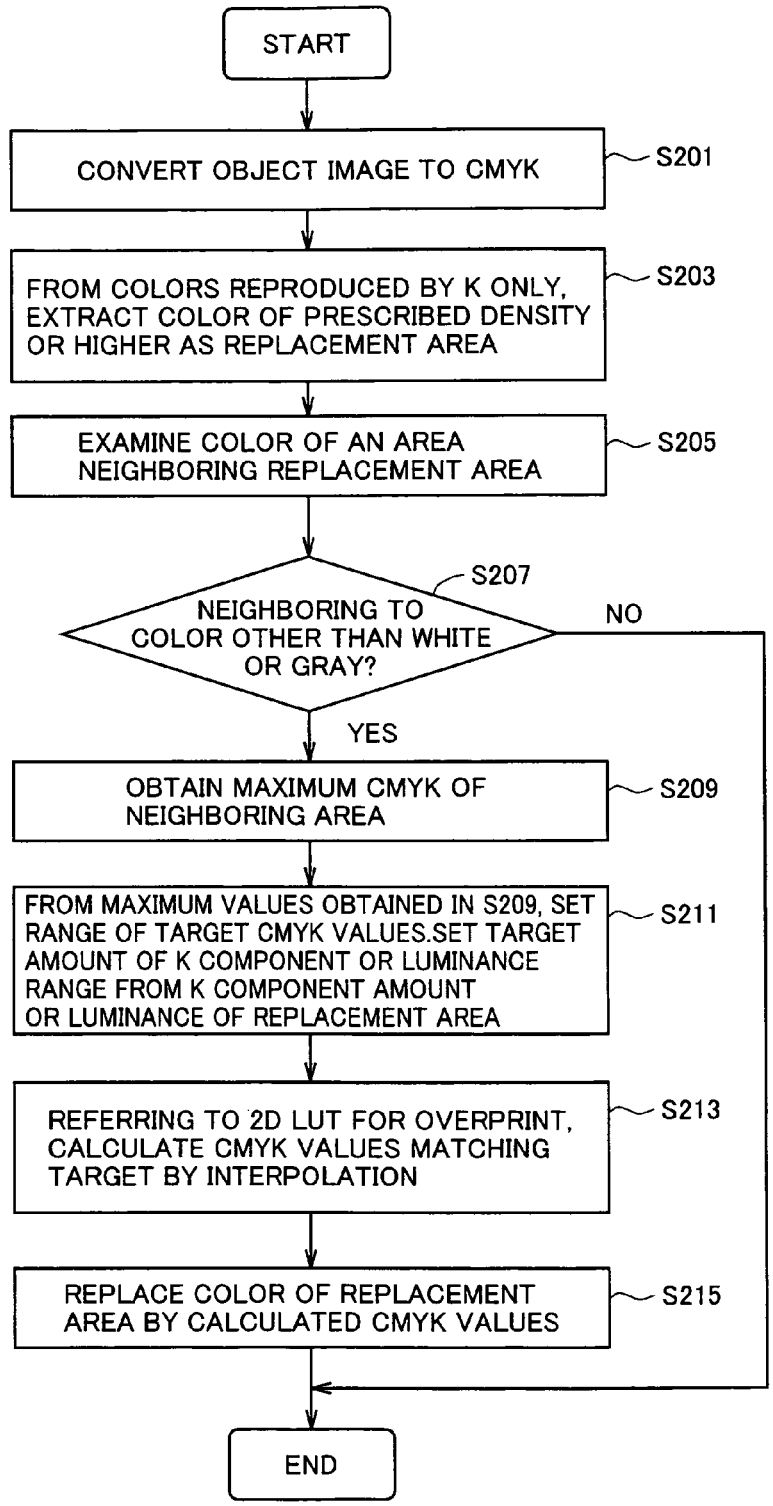
FIG. 10 a flow chart representing a basic flow of image processing executed by printer 10 in accordance with a first embodiment.

FIG. 10 is a flow chart representing the flow of image processing executed by printer 10 in accordance with the first embodiment, showing, in greater detail, the basic flow of image processing shown in FIG. 9.

Referring to FIG. 10, first, the object image is converted to CMYK color components (step S201), and from the image, an area reproduced by K component only and having a prescribed constant density or higher is extracted as a gray area to be the replacement area (step S203). The area reproduced by K component only refers to an image area not containing the CMY component and formed only of the K component. The process up to this step corresponds to the step of S10 described above.

Thereafter, the color of an area neighboring the area reproduced by K component only is extracted and examined (step S205). When the neighboring area includes any color other than the K component (YES in step S207), the maximum value for each of the CMY components is obtained (step S209). When the neighboring area is all white or reproduced by single color K, it is determined that color replacement is unnecessary (NO in step S207), and the process ends. The process up to this step corresponds to the process of step S20.

Figure 11:
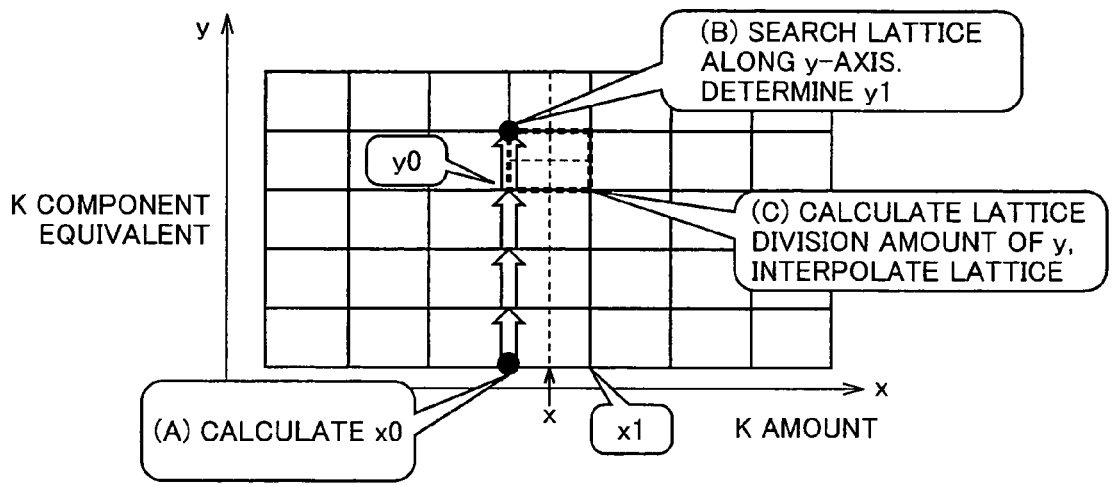
FIGS. 11 to 13 illustrate a search for the CMYK value using the two-dimensional LUT.

Thereafter, the replacing color indicated in step S30 is calculated. For calculating the replacing color, the above-described two-dimensional LUT for overprinting is used. More specifically, as shown in FIG. 11, from the two-dimensional LUT for overprinting, the lattice point x0 on the x-axis ((A) of FIG. 11) is obtained, which is closest to but not exceeding the amount of K component or luminance (as the amount of K component is in proportion to the luminance) of the area extracted in step S203. The LUT is searched along the y-axis, starting from the lattice point x0. Specifically, the CMY value of a lattice point in the LUT is compared with the maximum CMY value of the color around the replacement area obtained in step S209 as the target CMYK value, and when the CMY value of the lattice point in the LUT exceeds the CMY maximum value of the neighboring color, the search ends and the y-value at that time is regarded as y1 ((B) of FIG. 11) (step S211). Further, a lattice point x1 upper by one than x0 on the x-axis and a lattice point y0 lower by one than y1 on the y-axis are extracted, interpolation is done using an area surrounded by lattice points (x0, y0), (x1, y0), (x0, y1) and (x1, y1) and the CMYK value that matches the target mentioned above is calculated and the replacing color is obtained ((C) in FIG. 11) (step S213).

In step S213, by way of example, the following interpolation equations are used to calculate the CMYK value.

$$\Delta x = (x - x0)/(x1 - x0);$$

$$C0 = (C(x1, y0) - C(x0, y0)) \times \Delta x + C(x0, y0);$$

$$C1 = (C(x1, y1) - C(x0, y1)) \times \Delta x + C(x0, y1);$$

$$M0 = (M(x1, y0) - M(x0, y0)) \times \Delta x + M(x0, y0);$$

$$M1 = (M(x1, y1) - M(x0, y1)) \times \Delta x + M(x0, y1);$$

$$Y0 = (Y(x1, y0) - Y(x0, y0)) \times \Delta x + Y(x0, y0);$$

$$Y1 = (Y(x1, y1) - Y(x0, y1)) \times \Delta x + Y(x0, y1);$$

$$K0 = (K(x1, y0) - K(x0, y0)) \times \Delta x + K(x0, y0);$$

$$K1 = (K(x1, y1) - K(x0, y1)) \times \Delta x + K(x0, y1);$$

$$\Delta y = \text{MAX} \begin{pmatrix} ((\max C - C0)/(C1 - C0), \\ (\max M - M0)/(M1 - M0), \\ (\max Y - Y0)/(Y1 - Y0), 0) \end{pmatrix}$$

$$C = (C1 - C0) \times \Delta y + C0;$$

$$M = (M1 - M0) \times \Delta y + M0;$$

$$Y = (Y1 - Y0) \times \Delta y + Y0;$$

$$K = (K1 - K0) \times \Delta y + K0;$$

where maxC, maxM and maxY represent the maximum CMY values in the color neighboring to the replacement area.

Figure 12:
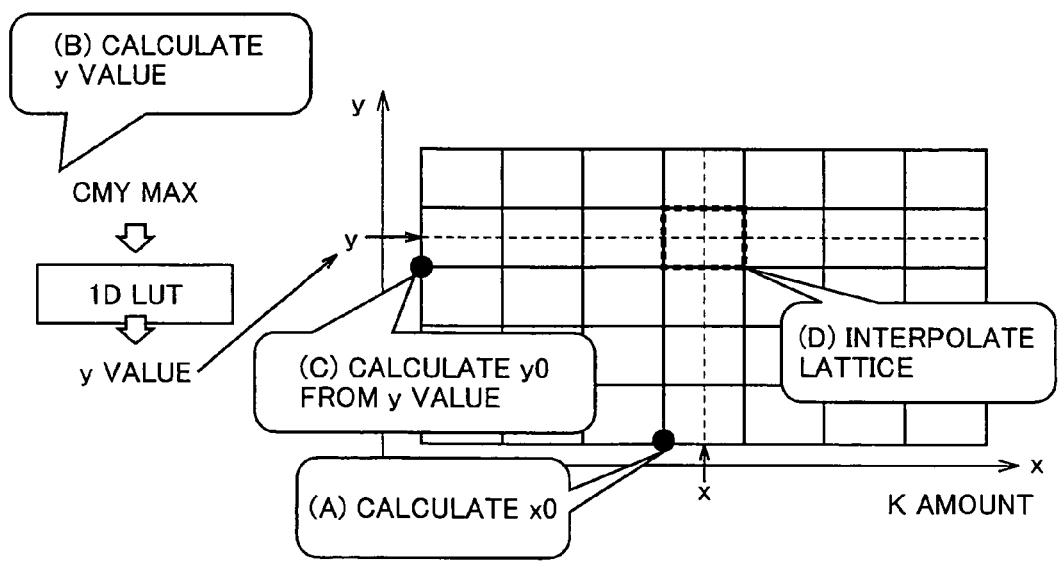

When the CMYK values and the xy values in the two-dimensional LUT are in such a relation as shown in FIGS. 5 to 8, the y value and the CMYK value are approximately in proportion, except for that area where the K value is small. In such a case, a one-dimensional LUT for calculating the y-value from the maximum CMY value may be prepared and used in the processing above. Specifically, using the proportional relation described above, the y value is calculated using the one-dimensional LUT from the maximum CMY value of the neighboring area ((B) of FIG. 12), and a lattice point y0 on the y-axis that does not exceed this y value is obtained ((C) of FIG. 12). Here, a general two-dimensional interpolation equation may be used.

Figure 13:
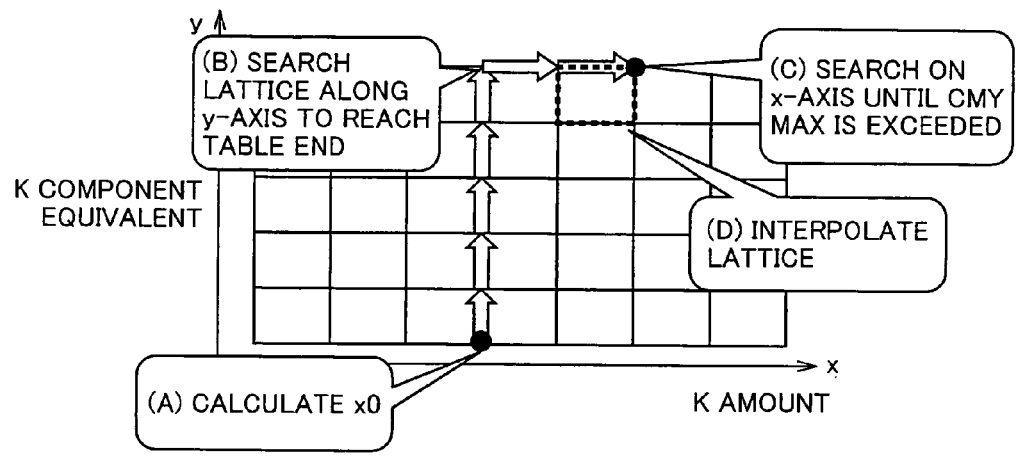

Further, when the LUT is searched along the direction of y-axis in step S211 above and the CMY value in the LUT lattice points does not exceed the maximum CMY value even when searched up to the end of the table (the area where x value is small in FIGS. 5 to 7), the LUT may be searched using the maximum value on the y-axis as it is ((B) and (C) of FIG. 13), or when the Y value among the CMY values is the maximum, the LUT may be searched using the CM maximum values with the Y value decreased or neglected, or the LUT may be searched with the x value increased (luminance increased) (or the x value decreased (luminance decreased)). In such a case, color replacement is not performed and the white gap may be prevented using a method (such as trapping) other than replacement of color in overprinting.

With the replacing color obtained from the CMYK value calculated by the process described above, the color of replacement area extracted in step S203 that has been reproduced by single color K is replaced (step S215).

Second Embodiment

The white gap resulting from mis-registration of presses tend to occur not only in the gray area reproduced by K component only but also when the amount (toner amount) of CMYK presses for an achromatic color and the amount of CMYK presses of the surrounding color are not smaller than a prescribed amount and no overlapping press (area) exists therebetween. Even when presses overlap, the output would have an almost white gap, if the amount of overlap were small.

Therefore, in the second embodiment, an achromatic color area including CMY colors is extracted as the replacement area in step S10. Here, the achromatic color represents a color of low chroma, which is near the gray axis of a color space, having very low chroma and hence very susceptible to the white gap or an output of almost white gap described above caused by mis-registration of presses. Here, the color range in which color channels a and b satisfy the following relation in Lab representation will be defined as the range of achromatic color.

$$\sqrt{(a^2+b^2)} < 1$$

Figure 14:
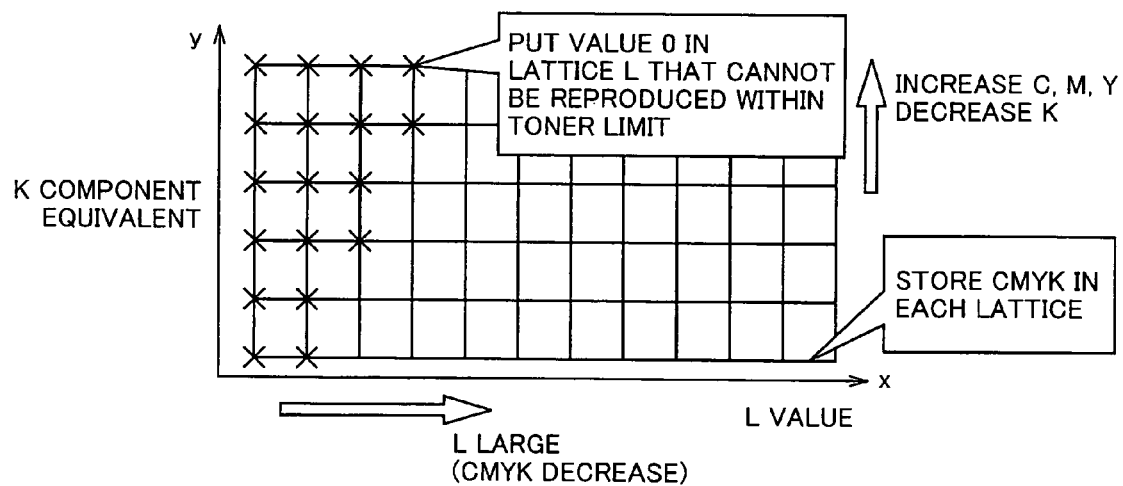
FIG. 14 shows a specific example of the two-dimensional LUT used in a second embodiment.

In printer 10 of the present embodiment, image processing similar to that shown in the flow chart of FIG. 10 is executed, and in steps S201 and S203, the color of each area of the object image is converted to the Lab value, and an area consisting of an achromatic color is extracted as the replacement area, using the relation above. When there is a color other than the K component in a neighboring area (YES in step S207), the replacing color is calculated using a two-dimensional LUT, as shown in step S30 above. In the second embodiment, a two-dimensional LUT in which the x-axis represents luminance L and the y-axis represents the K component equivalent as a ratio of CMYK components to the K component, such as shown in FIG. 14, is used.

It is noted, however, that if the replacement area of the object image has low luminance and the K component equivalent is increased, the amount of toner to be used increases, possibly exceeding the toner limit of the device. In that case, it is preferred to put a 0 at a corresponding portion of the two-dimensional LUT in advance, so that it can be detected as out of the limit. During the search of two-dimensional LUT, when a lattice that is out of the limit is found, the maximum CMY value used for the search is decreased to a level low enough to prevent any white gap, and the search is conducted again. Alternatively, the maximum CMY value used for the search may be decreased repeatedly by a prescribed amount, until a lattice that is within the limit can be found. If a lattice that is within the limit cannot be found even then, the luminance of the replacement area is increased by a prescribed amount and the search is conducted again.

Third Embodiment

In the third embodiment, a low-chroma color area is extracted as the replacement area, in step S10. Here, the range of low-chroma color refers to a color range that can be reproduced in every hue without exceeding the toner limit, even when the ratio of K component is the smallest and the luminance L is low. Specifically, the color range in which color channels a and b satisfy the following relation in Lab representation will be defined as the range of low-chroma color.

$$\sqrt{(a^2+b^2)} < 16$$

In printer 10 of the present embodiment, image processing similar to that shown in the flow chart of FIG. 10 is executed, and in steps S201 and S203, the color of each area of the object image is converted to the Lab value, and an area consisting of a low-chroma color is extracted as the replacement area, using the relation above. When there is a color other than the K component in a neighboring area (YES in step S207), the replacing color is calculated using a two-dimensional LUT, as shown in step S30 above. In the present embodiment, as the LUT for calculating the CMYK value for reproducing the low-chroma color as the color of replacement area by the CMYK component, a four-dimensional LUT is used.

Figure 15A:
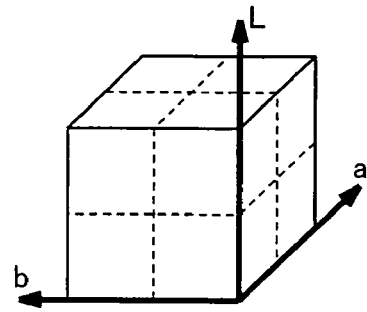
FIGS. 15A to 15C illustrate a concept of four-dimensional LUT used in a third embodiment.
Figure 15B:
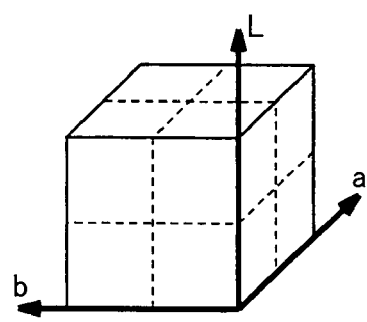
Figure 15C:
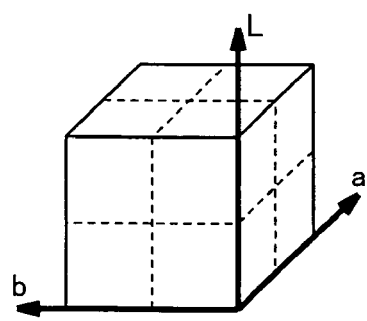

Referring to FIGS. 15A to 15C, the four-dimensional LUT used here is represented as a set of three-dimensional LUTs having the color channels a and b and the luminance L as axes (in FIG. 15A, K=100, in FIG. 15B, K=75 and in FIG. 15C, K=50). FIG. 16A shows a specific example showing the four-dimensional LUT in the form of an array. FIG. 16B shows correspondence between the number of each array in FIG. 16A and the K, L, a and b values, respectively.

In the present embodiment, from the four-dimensional LUT, lattice points y0, a0 and b0 that are closest to but not exceeding the luminance and color channels a and b of the area extracted in step S203 are obtained, and as the target range of luminance, the LUT is searched along the direction of K value axis from the lattice point.

In the present embodiment, in step S213, by way of example, the following interpolation equations are used to calculate the CMYK values that attain the target (the following equations are specific examples of equations for interpolating the C value). The equations below are general, multi-dimensional interpolating equations obtained by expanding, by one dimension, the equations for cubic correction of three-dimensional lattice, to handle a four-dimensional example.

$$\Delta L = (L - L0)/(L1 - L0);$$
$$\Delta a = (a - a0)/(a1 - a0);$$
$$\Delta b = (b - b0)/(b1 - b0);$$
$$\Delta y = (y - y0)/(y1 - y0);$$

-continued $$\begin{aligned}
C = &(1 - \Delta L)(1 - \Delta a)(1 - \Delta b)(1 - \Delta y)C(L0, a0, b0, y0) + \\
&(\Delta L)(1 - \Delta a)(1 - \Delta b)(1 - \Delta y)C(L1, a0, b0, y0) + \\
&(1 - \Delta L)(\Delta a)(1 - \Delta b)(1 - \Delta y)C(L0, a1, b0, y0) + \\
&(\Delta L)(\Delta a)(1 - \Delta b)(1 - \Delta y)C(L1, a1, b0, y0) + \\
&(1 - \Delta L)(1 - \Delta a)(\Delta b)(1 - \Delta y)C(L0, a0, b1, y0) + \\
&(\Delta L)(1 - \Delta a)(\Delta b)(1 - \Delta y)C(L1, a0, b1, y0) + \\
&(1 - \Delta L)(\Delta a)(\Delta b)(1 - \Delta y)C(L0, a1, b1, y0) + \\
&(\Delta L)(\Delta a)(\Delta b)(1 - \Delta y)C(L1, a1, b1, y0) + \\
&(1 - \Delta L)(1 - \Delta a)(1 - \Delta b)(\Delta y)C(L0, a0, b0, y1) + \\
&(\Delta L)(1 - \Delta a)(1 - \Delta b)(\Delta y)C(L1, a0, b0, y1) + \\
&(1 - \Delta L)(\Delta a)(1 - \Delta b)(\Delta y)C(L0, a1, b0, y1) + \\
&(\Delta L)(\Delta a)(1 - \Delta b)(\Delta y)C(L1, a1, b0, y1) + \\
&(1 - \Delta L)(1 - \Delta a)(\Delta b)(\Delta y)C(L0, a0, b1, y1) + \\
&(\Delta L)(1 - \Delta a)(\Delta b)(\Delta y)C(L1, a0, b1, y1) + \\
&(1 - \Delta L)(\Delta a)(\Delta b)(\Delta y)C(L0, a1, b1, y1) + \\
&(\Delta L)(\Delta a)(\Delta b)(\Delta y)C(L1, a1, b1, y1)
\end{aligned}$$

Figure 17:
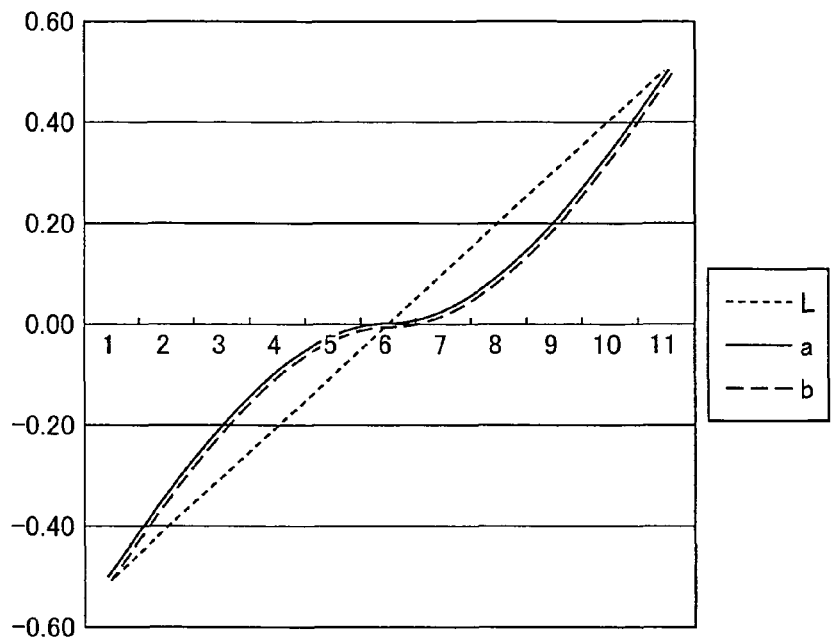
FIG. 17 represents a specific example of a one-dimensional LUT.

When the four-dimensional LUT used in the present embodiment consists of the L-axis, a-axis, b-axis and UCR axis as described above, the one-dimensional LUT such as shown in FIG. 17 may be applied before the interpolation, in order to improve accuracy of interpolation. As shown in FIG. 17, the amount of change is small where the values of a and b axes are small, and therefore, the a and b values on which the one-dimensional LUT is applied come to have LUT lattice points of fine scales where the values are small (corresponding to the low-chroma range). Consequently, the interpolation accuracy improves at that portion.

Figure 18:
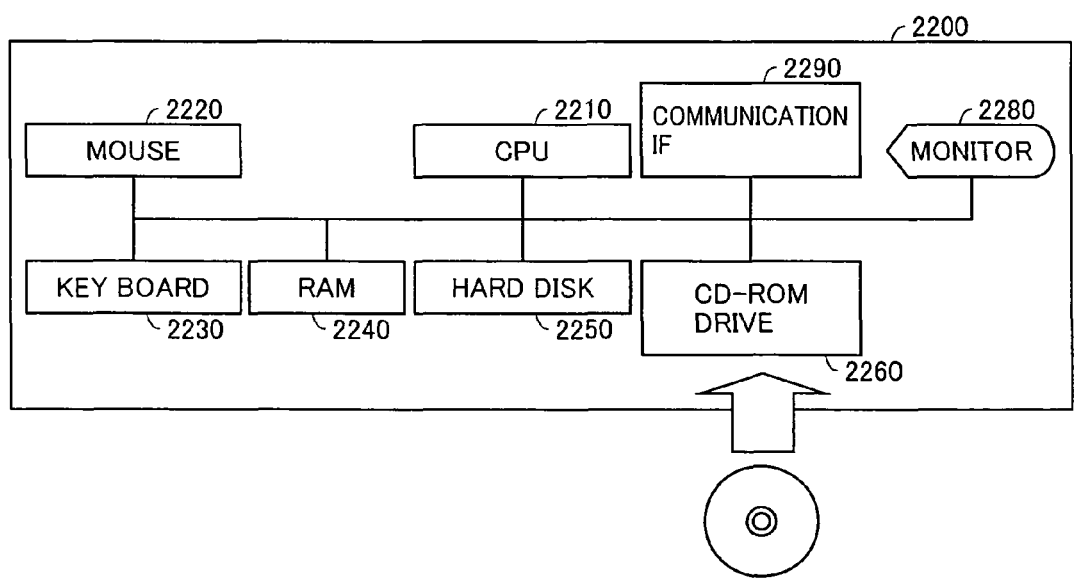
FIG. 18 is a block diagram representing a specific example of hardware configuration of a computer system 2200 implementing the image transmitting device, which is a printer 10, in accordance with an embodiment.

The image processing method and the image processing device implemented by printer 10 of the present embodiment may be provided as a program. Referring to FIG. 18, a computer system 2200 realizing an image transmitting device in accordance with the present embodiment, which is printer 10, will be described.

As can be seen from FIG. 18, computer system 2200 includes a CPU 2210, a mouse 2220 and a keyboard 2230 for receiving an instruction input, an RAM 2240 temporarily storing input data or data generated by a process executed in accordance with a program, a hard disk 2250 capable of storing data in a non-volatile manner, a CD-ROM (Compact Disk-Read Only Memory) drive 2260, a monitor 2280, and a communication IF (Interface) 2290, which are connected to each other through a data bus. A CD-ROM 2262 may be loaded to CD-ROM drive 2260.

The process in computer system 2200 functioning as an image transmitting device in accordance with the present invention, which is printer 10, is realized by a program product executed by CPU 2210 and various hardware that operate as the program product is executed. The program product as such may be stored in advance in RAM 2240 or hard disk 2250, or it may be stored and distributed on other data recording medium such as CD-ROM 2262. Alternatively, it may be distributed by downloading from a network. The program product includes the program itself and the recording medium on which the program is recorded. The data stored in the data recording medium is read from the data recording medium by CD-ROM drive 2260 or other reading device, and temporarily stored in hard disk 2250.

The program product is read from RAM 2240 or hard disk 2250 and executed by CPU 2210. The hardware of computer system 2200 shown in FIG. 18 is by itself a common one. Therefore, the essential portion of the present invention resides in the program product stored in RAM 2240, hard disk 2250, CD-ROM 2262 or other recording medium. Operations of various hardware of computer system 2200 are well known.

The program product provided by the invention is installed in a program storing unit such as a hard disk and executed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device, comprising:
   an area extracting unit for extracting, from an object image, a first area represented by a low-chroma color of black only or two or more of basic colors consisting of black, yellow, magenta and cyan;
   a neighboring color extracting unit extracting a neighboring color as a color of a second area neighboring said first area;
   a determining unit determining whether the color of said first area and said neighboring color should be superposed to prevent a visual gap from appearing due to a shift in color output of said first area;
   a table forming unit for forming, using color attributes of said image processing device, a table having luminance or an amount of black component of said low chroma color as an input value and component values of said basic colors having the Lab values of said low chroma color as output values;
   a replacing color calculating unit for calculating, for a replacement area that is said first area determined by said determining unit to be superposed, a replacing color closer to the tone of the color of said replacement area before superposing than the tone of the color resulting from superposing the color of said replacement area and said neighboring color, based on the color of said replacement area and said neighboring color;
   wherein said replacing color calculating unit calculates said replacing color by setting an input value to said table in accordance with the luminance or the amount of black component of the color of said replacement area in said table, and interpolating component values of said basic colors referenced from said table such that the interpolated component values do not exceed respective component values of the basic colors of said neighboring color; and
   a color replacing unit for replacing the color of said replacement area with said replacing color.

2. The image processing device according to claim 1, wherein said determining unit determines that the colors should be superposed, when amount of overlapping of each of the basic colors in said first area and the basic colors of said neighboring color is smaller than a prescribed value.

3. The image processing device according to claim 1, wherein said low-chroma color is a color of which color channels satisfy the relation of $$\sqrt{(a^2+b^2)} < 16$$

when represented in Lab values.

4. The image processing device according to claim 1, wherein said replacing color calculating unit sets, in said table, a range of component values of said basic colors in accordance with said input value, and when said value obtained by interpolation is out of said range, resets said range by changing said input value.

5. The image processing device according to claim 1, wherein said replacing color calculating unit sets, in said table, a range of component values of said basic colors in accordance with said input value, and when said value obtained by interpolation is out of said range, resets said range by changing component value of a specific one of said basic colors forming said neighboring color.

6. An mage processing device comprising:
   an area extracting unit for extracting, from an object image, a first area represented by a low-chroma color of black only or two or more basic colors consisting of black, yellow, magenta, and cyan;
   a neighboring color extracting unit extracting a neighboring color as a color of a second area neighboring said first area;
   a determining unit determining whether the color of said first area and said neighboring color should be superposed to prevent a visual gap from appearing due to a shift in color output of said first area;
   a table forming unit for forming, using color attribute of said image processing device, a table having a black component value of said low chroma color and an L value, an a value, and a b value of said low chroma color represented by Lab values as input values and component values of said basic colors having the Lab values of said low chroma color as output values;
   a replacing color calculating unit for calculating, for a replacement area that is said first area determined by said determining unit to be superposed, a replacing color closer to the tone of the color of said replacement area before superposing than the tone of the color resulting from superposing the color of said replacement area and said neighboring color, based on the color of said replacement area and said neighboring color,
   wherein said replacing color calculating unit calculates said replacing color by setting an input value to said table in accordance with the black component value, the L value, the a value, and the b value of the color of said replacement area in said table, and interpolating component values of said basic colors referenced from said table such that the interpolated component values do not exceed respective component values of the basic colors of said neighboring color; and
   a color replacing unit for replacing the color of said replacement area with said replacing color.

7. The image processing device according to claim 6, wherein said replacing color calculating unit sets, in said table, a range of component values of said basic colors in accordance with said input value, and when said value obtained by interpolation is out of said range, resets said range by changing said input value.

8. The image processing device according to claim 6, wherein said replacing color calculating unit sets, in said table, a range of component values of said basic colors in accordance with said input value, and when said value obtained by interpolation is out of said range, resets said range by changing component value of a specific one of said basic colors forming said neighboring color.

9. A method of image processing by an image processing device comprising a processor that executes an image processing program, the method comprising:
   extracting, through a color extracting unit of the processor, an object image having a first area represented by a low-chroma color of black only or two or more of basic colors consisting of black, yellow, magenta and cyan;

extracting, through the color extracting unit, a neighboring color as a color of a second area neighboring said first area;

determining through an overprint determining unit of the processor, whether the color of said first area and said neighboring color should be superposed to prevent a visual gap from appearing due to a shift in color output of said first area;

calculating, through a color calculating unit of the processor, a replacing color closer to the tone of the color of a replacement area before superposing than the tone of the color resulting from superposing the color of said replacement area and said neighboring color, based on the color of said replacement area and said neighboring color; and wherein the replacement area is said first area determined by said determining unit to be superposed;

replacing, through a color replacing unit of the processor, the color of said replacement area with said replacing color, thereby transforming the object image, wherein said processor of said image processing device includes a table forming unit for forming, using color attribute of said image processing device, a table having luminance or an amount of black component of said low-chroma color as an input value and component values of said basic colors having the Lab values of said low-chroma color as output values; and in said replacing color calculating step, said replacing color is calculated by setting an input value to said table in accordance with the luminance or the amount of black component of the color of said replacement area in said table, and interpolating component values of said basic colors referenced from said table such that the interpolated component values do not exceed respective component values of the basic colors of said neighboring color.

10. The image processing method according to claim 9, wherein in said determining step, when amount of overlapping of each of the basic colors in said first area and the basic colors of said neighboring color is smaller than a prescribed value, it is determined that the colors should be superposed.

11. The image processing method according to claim 9, wherein said low-chroma color is a color of which color channels satisfy the relation of $\sqrt{(a^2+b^2)}<16$ when represented in Lab values.

12. The image processing method according to claim 9, wherein in said replacing color calculating step, in said table, a range of component values of said basic colors is set in accordance with said input value, and when said value obtained by interpolation is out of said range, said range is reset by changing said input value.

13. The image processing method according to claim 9, wherein in said replacing color calculating step, in said table, a range of component values of said basic colors is set in accordance with said input value, and when said value obtained by interpolation is out of said range, said range is reset by changing component value of a specific one of said basic colors forming said neighboring color.

14. A method of image processing by an image processing device comprising a processor that executes an image processing program, the method comprising:

extracting, through a color extracting unit of the processor, an object image having a first area represented by a low-chroma color of black only or two or more of basic colors consisting of black, yellow, magenta, and cyan;

extracting, through the color extracting unit, a neighboring color as a color of a second area neighboring said first area;

determining through an overprint determining unit of the processor, whether the color of said first area and said neighboring color should be superposed to prevent a visual gap from appearing due to a shift in color output of said first area;

calculating, through a color calculating unit of the processor, a replacing color closer to the tone of the color of a replacement area before superposing than the tone of the color resulting from superposing the color of said replacement area and said neighboring color, based on the color of said replacement area and said neighboring color; and wherein the replacement area is said first area determined by said determining unit to be superposed;

replacing, through a color replacing unit of the processor, the color of said replacement area with said replacing color, thereby transforming the object image, wherein said processor of said image processing device includes a table forming unit for forming, using color attribute of said image processing device, a table having a black component value of said low chroma color and an L value, an a value, and a b value of said low chroma color represented by Lab values as input values and component values of said basic colors having the Lab values of said low chroma color as output values; and in said replacing color calculating step, said replacing color is calculated by setting an input value to said table in accordance with the black component value and the L value, the a value, and the b value of the color of said replacement area in said table, and interpolating component values of said basic colors referenced from said table such that the interpolated component values do not exceed respective component values of the basic colors of said neighboring color.

15. The image processing method according to claim 14, wherein in said replacing color calculating step, in said table, a range of component values of said basic colors is set in accordance with said input value, and when said value obtained by interpolation is out of said range, said range is reset by changing said input value.

16. The image processing method according to claim 14, wherein in said replacing color calculating step, in said table, a range of component values of said basic colors is set in accordance with said input value, and when said value obtained by interpolation is out of said range, said range is reset by changing component value of a specific one of said basic colors forming said neighboring color.

17. A program product embodied in a computer-readable non-transitory medium for causing a computer to execute image processing in an image processing device comprising:

an area extracting step of extracting, from an object image input to said image processing device, a first area represented by a low-chroma color of black only or two or more of basic colors consisting of black, yellow, magenta and cyan;

a neighboring color extracting step of extracting a neighboring color as a color of a second area neighboring said first area;

a determining step of determining whether the color of said first area and said neighboring color should be superposed to prevent a visual gap from appearing due to a shift in color output of said first area;

a replacing color calculating step of calculating, for a replacement area that is said first area determined by said determining unit to be superposed, a replacing color closer to the tone of the color of said replacement area before superposing than the tone of the color resulting from superposing the color of said replacement area and said neighboring color, based on the color of said replacement area and said neighboring color; and a color replacing step of replacing the color of said replacement area with said replacing color, wherein said image processing device includes a table forming unit for forming, using color attribute of said image processing device, a table having luminance or an amount of black component of said low-chroma color as an input value and component values of said basic colors having the Lab values of said low-chroma color as output values; and in said replacing color calculating step, said replacing color is calculated by setting an input value to said table in accordance with the luminance or the amount of black component of the color of said replacement area in said table, and interpolating component values of said basic colors referenced from said table such that the interpolated component values do not exceed respective component values of the basic colors of said neighboring color.

18. The image processing program product according to claim 17, wherein in said determining step, when amount of overlapping of each of the basic colors in said first area and the basic colors of said neighboring color is smaller than a prescribed value, it is determined that the colors should be superposed.

19. The image processing program product according to claim 17, wherein said low-chroma color is a color of which color channels satisfy the relation of $\sqrt{(a^2+b^2)}<16$ when represented in Lab values.

20. The image processing program product according to claim 17, wherein in said replacing color calculating step, in said table, a range of component values of said basic colors is set in accordance with said input value, and when said value obtained by interpolation is out of said range, said range is reset by changing said input value.

21. The image processing program product according to claim 17, wherein in said replacing color calculating step, in said table, a range of component values of said basic colors is set in accordance with said input value, and when said value obtained by interpolation is out of said range, said range is reset by changing component value of a specific one of said basic colors forming said neighboring color.

22. A processing program product embodied in a computer-readable non-transitory medium for causing a computer to execute image processing in an image processing device comprising:

an area extracting step of extracting, from an object image input to said image processing device, a first area represented by a low-chroma color of black only or two or more of basic colors consisting of black, yellow, magenta and cyan;

a neighboring color extracting step of extracting a neighboring color as a color of a second area neighboring said first area;

a determining step of determining whether the color of said first area and said neighboring color should be superposed to prevent a visual gap from appearing due to a shift in color output of said first area;

a replacing color calculating step of calculating, for a replacement area that is said first area determined by said determining unit to be superposed, a replacing color closer to the tone of the color of said replacement area before superposing than the tone of the color resulting from superposing the color of said replacement area and said neighboring color, based on the color of said replacement area and said neighboring color; and a color replacing step of replacing the color of said replacement area with said replacing color, wherein said image processing device includes a table forming unit for forming, using color attribute of said image processing device, a table having a black component value of said low chroma color and an L value, an a value, and a b value of said low chroma color represented by Lab values as input values and component values of said basic colors having the Lab values of said low chroma color as output values; and in said replacing color calculating step, said replacing color is calculated by setting an input value to said table in accordance with the black component value and the L value, the a value, and the b value of the color of said replacement area in said table, and interpolating component values of said basic colors referenced from said table such that the values do not exceed respective component values of the basic colors of said neighboring color.

23. The image processing program product according to claim 22, wherein in said replacing color calculating step, in said table, a range of component values of said basic colors is set in accordance with said input value, and when said value obtained by interpolation is out of said range, said range is reset by changing said input value.

24. The image processing program product according to claim 22, wherein in said replacing color calculating step, in said table, a range of component values of said basic colors is set in accordance with said input value, and when said value obtained by interpolation is out of said range, said range is reset by changing component value of a specific one of said basic colors forming said neighboring color.

* * * * *